Patented Jan. 24, 1928.

1,657,430

UNITED STATES PATENT OFFICE.

AUGUSTUS E. CRAVER, OF NEW YORK, N. Y., ASSIGNOR TO THE GRASSELLI CHEMICAL COMPANY, OF CLEVELAND, OHIO, A CORPORATION OF OHIO.

COLLOIDAL COPPER SULPHIDE AND PROCESS OF PREPARING THE SAME.

No Drawing.   Application filed October 25, 1926.   Serial No. 144,189.

The present invention relates to a precipitation process for the manufacture of colloidal solutions or suspensions of metals and metallic compounds.

It is known that colloidal suspensions of metallic compounds generally may be prepared by precipitating the same in the presence of an agent known variously as a protective colloid, a deflocculating agent or a dispersion agent. It is known, also, that sulphide solutions may be stabilized by means of gum arabic, sodium sulphide, casein, albumen and the like.

I have discovered that a colloidal solution of copper sulphide, in which the size of the copper sulphide particles is substantially not greater than one-four-thousandth m. m. (250 $\mu\mu$) in linear dimension, may be prepared by precipitating the copper sulphide in the presence of a protective colloid.

The manner in which I propose to prepare the aforesaid colloidal solution of copper sulphide is as follows: An aqueous solution of a soluble salt of copper is treated with a sulphide in the presence of a protective colloid, with the formation of colloidal copper sulphide.

The following examples illustrate, but do not limit, my invention.

*Example I.*—A solution containing 65.3 grams of copper sulphate ($CuSO_4.5H_2O$) in 200 c. c. of distilled water is added, at the rate of about 1 c. c. per minute, to an aqueous solution of 50 grams of the product obtained by evaporating cellulose waste liquor to dryness dissolved in 100 c. c. of distilled water, with continuous vigorous agitation, and a stream of hydrogen sulphide ($H_2S$) is continuously bubbled through the latter solution at a rate so regulated that the presence of a slight excess of $H_2S$ in said solution is insured. After the copper sulphate solution is added, the hydrogen sulphide treatment is continued for some time,—e. g. for about 15 minutes, or until all the copper sulphate has been converted to copper sulphide.

A colloidal solution of copper sulphide prepared as described is characterized by the following properties:

(1) The solution is non-opalescent.

(2) The solution does not settle out of deposit copper sulphide on standing for a six months' period.

(3) Upon dilution, it gives a dark-green clear solution with transmitted light and an intense greenish-blue color with reflected light.

(4) Microscopic examination even at 800 magnifications fails to distinguish any particles, i. e., the particles are of ultramicroscopic size.

(5) The solution may be evaporated to dryness at 95°–100° C., the residue powdered, and the powdered residue dissolved in water to the resumption of a completely clear colloidal solution and without impairment of the colloidality of the original copper sulphide solution.

(6) The solution possesses extreme stability and permanence with regard to added electrolytes and other compounds.

The above colloidal copper sulphide solution contains an amount of sulphuric acid approximately equal in quantity to the copper sulphide present. This free acid may be neutralized by converting it to a soluble, or insoluble, sulphate. Thus, for example, the acid content of the colloidal solution may be determined by analysis and to the solution may be added a quantity of a caustic alkali hydroxide or a carbonate or hydroxide of an alkaline-earth metal calculated to exactly neutralize the free acid. Although I do not wish to be limited to the use of any specific neutralizing agent, I prefer to neutralize the free sulphuric acid content of the colloidal solution by the addition thereto of solid calcium carbonate ($CaCO_3$) to neutral reaction. The calcium sulphate ($CaSO_4$) may be removed from the colloidal solution by filtration.

Subsequent to the neutralization of the free sulphuric acid, the clear solution may be evaporated to dryness at 95–100° C., the thus obtained greenish-black residue powdered, and the powdered residue brought into solution with water without impairment of any of the colloidal characteristics of the original product.

*Example II.*—Another method by which I propose to make colloidal copper sulphide is to effect reaction between solutions of substantially equi-molecular amounts of copper sulphate and barium sulphide (BaS) in the presence of an aqueous solution of the product obtained by evaporation of cellulose waste liquor to dryness. By this reaction no free sulphuric acid or soluble sulphate is formed; the barium sulphate so formed, being insoluble.

The solution obtained exhibits the same colloidal characteristics as those inherent in the product obtained according to the preceding example. Thus, the solution may be evaporated to dryness, the dry residue powdered, and the resulting powdered residue dissolved in water without the loss of its original colloidal properties.

*Example III.*—A solution containing 62.8 grams of $Na_2S.9H_2O$ in 75 c. c. of water is added, at the rate of about 1 c. c. per minute, to a solution containing 65.3 grams of $CuSO_4.5H_2O$ and 50 grams of the product obtained by evaporating cellulose waste liquor to dryness in 200 c. c. of water, with continuous vigorous agitation.

The colloidal copper sulphide solution thus obtained has an intensely dark greenish-blue color. On dilution with a large volume of water the solution has a yellowish-green color with transmitted light and a very dark greenish-blue color with reflected light. The colloidal particles are however not as small as those produced by the use of hydrogen sulphide as described in Example I. The particles are plainly visible under a magnification of 800. The solution is slightly opalescent and drying at 100° C. impairs the colloidality to small extent.

The sodium sulphate ($Na_2SO_4$) resulting from the above reaction may be removed by treatment with calcium hydroxide or calcium carbonate and subsequent filtration.

It has been found that colloidal copper sulphide is effective in fungicidal and insecticidal preparations and in anti-fouling paints. Other substances either colloidal or non-colloidal may be added to or mixed with the colloidal copper sulphide, depending upon the use to which the colloidal copper sulphide is to be put. The present invention, however, is not limited to these, or any other specific, uses.

It will be obvious to those skilled in the art that the exact procedures and conditions hereinbefore described might be altered without departing from the spirit of my invention as defined in the appended claims. For example, other precipitating agents than the sulphides named are capable of effecting the reaction. Likewise, other soluble compounds of copper might be substituted for copper sulphate.

In general all water soluble copper salts such as copper nitrate and copper chloride may be used. The use to which the colloidal copper sulphide is to be put may determine what copper compound may be used. For instance, if the colloidal copper sulphide is to be used as a fungicide or insecticide the presence of hydrochloric acid or nitric acid or their alkali metal salts formed by neutralization in the product would be objectionable.

It also is obvious that the conditions hereinbefore described might be changed and still obtain a copper sulphide solution or suspension having some of the characteristics of a colloid.

Instead of the product obtained by evaporating cellulose waste liquor (waste sulfite liquor resulting from the manufacture of cellulose from wood) to dryness the liquor itself without evaporation or other protective colloids such as glue, gelatin, etc., may be employed.

I claim:

1. Process of preparing colloidal copper sulphide comprising treating an aqueous solution of a copper salt with a water soluble sulphide in the presence of a protective colloid.

2. Process of preparing colloidal copper sulphide comprising treating an aqueous solution of a copper salt with a water soluble sulphide in the presence of a solution of the solid constituents of cellulose waste liquor.

3. Process of preparing colloidal copper sulphide comprising treating an aqueous solution of a copper salt with a water soluble sulphide in the presence of a water solution of the evaporation residue of cellulose waste liquor.

4. Process of preparing colloidal copper sulphide comprising treating an aqueous solution of copper sulphate with a sulphide in the presence of a protective colloid, combining the resulting $-SO_4$ radicles with a salt-forming compound of an alkaline-earth metal and separating the resulting alkaline-earth metal sulphate from the colloidal solution of copper sulphide.

5. Process of preparing colloidal copper sulphide, as defined in claim 4, in which the copper sulphate solution is treated with hydrogen sulphide.

6. Process of preparing colloidal copper sulphide, as defined in claim 4, in which the alkaline-earth metal compound is calcium carbonate.

7. Process of preparing colloidal copper sulphide, as defined in claim 4, in which the copper sulphate solution is treated with hydrogen sulphide and in which the alkaline-earth metal compound is calcium carbonate.

8. Process of preparing colloidal copper sulphide comprising adding, at the rate of about 1 c. c. per minute, a solution containing 65.3 grams of copper sulphate in 200 grams of distilled water to a solution containing 50 grams of the evaporation residue of cellulose waste liquor in 100 grams of distilled water, with continuous agitation, simultaneously passing a stream of hydrogen sulphide into the solution, neutralizing the resulting sulphuric acid content of the colloidal solution so formed by treating said solution with calcium carbonate and separating the resulting calcium sulphate from the colloidal copper sulphide solution.

9. A new composition of matter comprising colloidal copper sulphide in particle size substantially not greater than 250 $\mu\mu$ in linear dimension.

10. A new composition of matter comprising a solution containing colloidal copper sulphide in particle size substantially not greater than 250 $\mu\mu$ in linear dimension.

11. A new composition of matter comprising colloidal copper sulphide in an aqueous solution of the solid constituents of cellulose waste liquor.

12. Process of preparing colloidal copper sulphide comprising treating an aqueous solution of a copper salt and a protective colloid with hydrogen sulphide.

13. Process of preparing colloidal copper sulphide comprising treating an aqueous solution of copper sulphate and the evaporation residue of cellulose waste liquor with hydrogen sulphide.

14. A new composition of matter comprising a solution of a protective colloid containing therein colloidal copper sulphide in particle size substantially not greater than 250 $\mu\mu$ in linear dimension.

15. A new composition of matter comprising a solution of the solid constituents of cellulose waste liquor containing therein colloidal copper sulphide in particle size substantially not greater than 250 $\mu\mu$ in linear dimension.

In testimony whereof, I affix my signature.

AUGUSTUS E. CRAVER.